United States Patent
Pavao-Moriera et al.

(10) Patent No.: US 10,120,064 B2
(45) Date of Patent: Nov. 6, 2018

(54) RADAR SYSTEM AND METHOD WITH SATURATION DETECTION AND RESET

(71) Applicant: FREESCALE SEMICONDUCTOR INC., Austin, TX (US)

(72) Inventors: Cristian Pavao-Moriera, Frouzins (FR); Dominique Delbecq, Fonsorbes (FR); Birama Goumballa, Larra (FR)

(73) Assignee: NXP USA, Inc., Austin, TX (US)

( * ) Notice: Subject to any disclaimer, the term of this patent is extended or adjusted under 35 U.S.C. 154(b) by 467 days.

(21) Appl. No.: 14/829,980

(22) Filed: Aug. 19, 2015

(65) Prior Publication Data
US 2016/0266239 A1 Sep. 15, 2016

(30) Foreign Application Priority Data

Mar. 19, 2015 (WO) .................. PCT/IB2015/000539

(51) Int. Cl.
| | |
|---|---|
| *G01S 13/08* | (2006.01) |
| *G01S 13/32* | (2006.01) |
| *G01S 7/35* | (2006.01) |
| *G01S 13/34* | (2006.01) |

(52) U.S. Cl.
CPC .............. *G01S 7/354* (2013.01); *G01S 13/08* (2013.01); *G01S 13/34* (2013.01)

(58) Field of Classification Search
CPC .......... G01S 7/354; G01S 13/08; G01S 13/34; G01S 7/2813; G01S 7/2923; G01S 7/2921; G01S 7/2927; G01S 13/32; G01S 13/44; G01S 13/10; G01S 7/003; G01S 13/536; G01S 13/325; H03D 5/00; H03H 7/12; H04L 12/4625; H04B 1/30; H04W 36/0061; H03F 1/34; H03F 3/3028; G01J 1/4228; H03L 7/0992; H02H 9/02
USPC ........................................................ 342/159
See application file for complete search history.

(56) References Cited

U.S. PATENT DOCUMENTS

| | | |
|---|---|---|
| 3,792,473 A | 2/1974 | Sawicki |
| 3,942,178 A | 3/1976 | Hackett |
| 4,023,168 A * | 5/1977 | Bruder .................... G01S 13/10 342/120 |

(Continued)

FOREIGN PATENT DOCUMENTS

| | | | |
|---|---|---|---|
| EP | 3006955 A1 | 4/2016 | |
| GB | 2218293 A * | 11/1989 | ............. G01S 7/023 |

(Continued)

OTHER PUBLICATIONS

Extended Search Report for the International application No. EP 16158269.7 dated Aug. 22, 2016.

*Primary Examiner* — Timothy A. Brainard
*Assistant Examiner* — Nuzhat Pervin

(57) ABSTRACT

The embodiments described herein provide a radar device and method that can provide improved sensitivity. In general, the embodiments described herein provide a saturation detector and reset mechanism coupled to a radar receiver. The saturation detector is configured to detect saturation events in the radar receiver, and the reset mechanism is configured to reset at least one filter unit in the radar receiver in response to detected saturation events. As such, the embodiments can facilitate improved radar sensitivity by reducing the effects of saturation events in the radar receiver.

20 Claims, 8 Drawing Sheets

(56) References Cited

U.S. PATENT DOCUMENTS

| | | | |
|---|---|---|---|
| 4,101,889 A * | 7/1978 | Evans | G01S 7/2927 342/16 |
| 4,282,524 A * | 8/1981 | Eymann | G01S 13/32 342/122 |
| 4,398,196 A * | 8/1983 | Wiegand | G01S 7/2921 342/13 |
| 5,012,253 A | 4/1991 | Schuster et al. | |
| 5,705,807 A * | 1/1998 | Throngnumchai | G01J 1/4228 250/214 B |
| 6,236,352 B1 * | 5/2001 | Walmsley | G01S 13/325 342/118 |
| 6,304,141 B1 * | 10/2001 | Kennedy | H03F 3/3028 330/253 |
| 6,795,006 B1 | 9/2004 | Delight et al. | |
| 6,911,859 B2 * | 6/2005 | Komiak | H03D 5/00 327/350 |
| 7,345,618 B1 * | 3/2008 | Cole | G01S 13/32 342/22 |
| 8,340,618 B2 | 12/2012 | Sorrells et al. | |
| 8,471,761 B1 * | 6/2013 | Hogg | G01S 13/536 342/114 |
| 8,599,060 B2 * | 12/2013 | Vanuytven | G01S 13/44 342/159 |
| 2003/0223480 A1 * | 12/2003 | Cafarella | H04B 1/30 375/219 |
| 2004/0213357 A1 * | 10/2004 | Komiak | H03D 5/00 375/316 |
| 2008/0157846 A1 * | 7/2008 | Liu | H03F 1/34 327/307 |
| 2010/0265121 A1 * | 10/2010 | Bandhauer | G01S 7/2923 342/135 |
| 2011/0148686 A1 * | 6/2011 | Cole | G01S 13/32 342/22 |
| 2011/0181455 A1 * | 7/2011 | Vanuytven | G01S 7/2813 342/27 |
| 2012/0182876 A1 * | 7/2012 | Miyabe | H04L 12/4625 370/242 |
| 2012/0218138 A1 * | 8/2012 | Reiter | G01S 7/003 342/91 |
| 2015/0264614 A1 * | 9/2015 | Stager | H04W 36/0061 370/332 |
| 2015/0301158 A1 * | 10/2015 | Foreman | G01S 7/2813 342/159 |
| 2015/0318860 A1 * | 11/2015 | Wang | H03L 7/0992 327/157 |
| 2016/0103206 A1 | 4/2016 | Pavao-Moreira et al. | |
| 2016/0233846 A1 * | 8/2016 | Pavao-Moreira | H03H 7/12 |
| 2017/0141565 A1 * | 5/2017 | White | H02H 9/02 |

FOREIGN PATENT DOCUMENTS

| | | | |
|---|---|---|---|
| GB | 2218293 A | 11/1989 | |
| GB | 2458289 A * | 9/2009 | G01S 7/021 |

* cited by examiner

RADAR SYSTEM AND METHOD WITH SATURATION DETECTION AND RESET

CROSS REFERENCE TO RELATED APPLICATION

This application claims priority to International Bureau Application No. PCT/IB2015/000539, filed Mar. 19, 2015, the entirety of which is hereby incorporated by reference herein.

TECHNICAL FIELD

This embodiments described herein generally relate to radar systems and methods of their operation.

BACKGROUND

A typical radar system transmits an electromagnetic signal and receives back reflections of the transmitted signal. The time delay between the transmitted and received signals can be determined and used to calculate the distance and/or the speed of objects causing the reflections. For example, in automotive applications radar systems can be used to determine the distance and/or the speed of oncoming vehicles and other obstacles.

Modern radar systems often use modulated radar signals to increase sensitivity. Some such systems use repeating modulation schemes, where the radar signal is modulated in a repeating periodic frame-by-frame pattern. While such radar systems can provide increased sensitivity, they can be susceptible to certain types of interference. Such systems will thus commonly include filters in the radar receivers to help avoid interferences. For example, in some radar receivers, high pass filters with low cut-off frequencies are often used to attenuate low frequency interferences. In automotive applications these filters can be used to avoid the "bumper effect" that can be caused by reflections from car bumpers.

Unfortunately, such radar systems can be susceptible to saturation in the radar receivers. In general, saturation occurs when the input to an amplifier rises above a maximum input voltage. Such an input causes the amplifier to produce a maximum allowable current and/or voltage, a situation commonly referred to as "clipping". Because the output of the amplifier is at the maximum level, no usable data is produced while the amplifier is in saturation. In a radar receiver, such saturation can cause a temporary "blindness" of the radar receiver. Saturation is particularly problematic if the saturation extends across multiple frames of the transmitted signal. In modulated radar systems the frame period can be relatively short, and thus in those systems saturation can significantly impede the proper functioning of the radar device.

DETAILED DESCRIPTION

The embodiments described herein provide a radar device and method that can provide improved sensitivity by reducing effects of saturation in the radar device. In general, the embodiments described herein provide a saturation detector and reset mechanism coupled to a radar receiver unit. The saturation detector is configured to detect saturation events in the receiver unit, and the reset mechanism is configured to reset filters in the receiver unit in response to detected saturation events. As such, the embodiments can facilitate improved radar sensitivity by reducing the effects of saturation events in the radar receiver.

Figure 1:
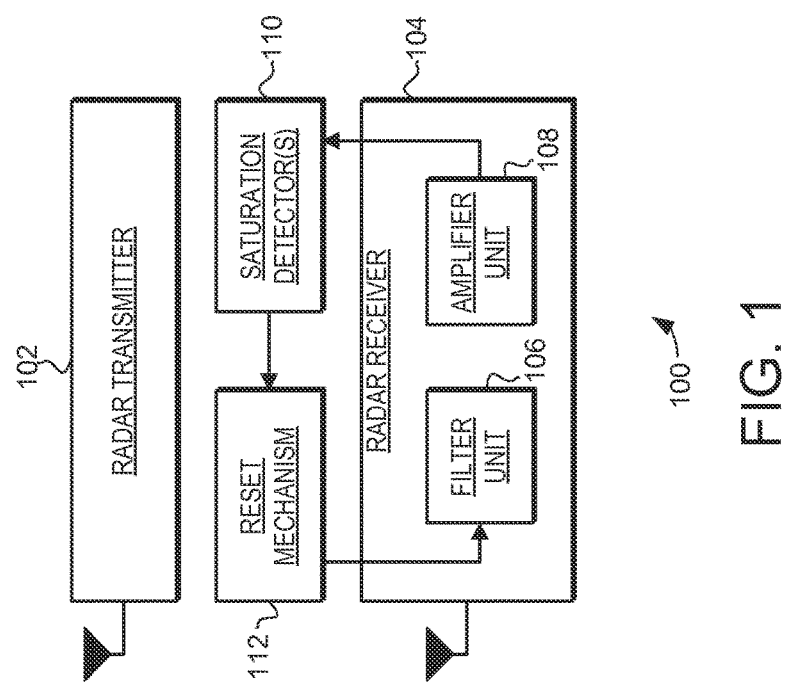
FIG. 1 is a schematic diagram of a radar device in accordance with an example embodiment.

Turning now to FIG. 1, a schematic diagram of a radar device 100 is illustrated. The radar device 100 includes at least one radar transmitter 102, at least one radar receiver 104, saturation detector(s) 110, and a reset mechanism 112. The radar transmitter 102 is configured to transmit a radar signal, and the radar receiver 104 is configured to receive a reflection of the transmitted radar signal. The radar receiver 104 includes at least one filter unit 106 configured to filter the received radar signal and at least one amplifier unit 108 configured to amplify the received radar signal. In accordance with the embodiments described herein, the saturation detector 110 is coupled to the amplifier unit 108 and configured to detect saturation events in the amplifier unit 108. The reset mechanism 112 is coupled to the at least one filter unit 106, and the saturation detector, and is configured to reset the at least one filter unit 106 in response to a detected saturation event.

The reset of the at least one filter unit 106 can facilitate improved sensitivity of the radar device 100. Specifically, the reset of the at least one filter 106 can prevent the temporary blindness of the radar device 100 that could otherwise occur if the saturation of the amplifier unit 108 were allowed to extend significantly in time.

In one embodiment, the radar device 100 is configured to use a frequency modulated radar signal. For example, such frequency modulation can include frame periods of one modulation type interleaved with inter-frame periods of another modulation type. For example, the transmitter 102 can be configured to transmit a radar signal that increases in frequency during frame periods and decreases in frequency during inter-frame periods. Alternatively, the transmitter 102 can be configured to transmit a radar signal that decreases in frequency during frame periods and increases in frequency during inter-frame periods. In either of such embodiments the reset of the filter unit 106 can be performed during the inter-frame period such that the amplifier unit 108 is ready for the next frame period.

In some specific embodiments, the radar device 100 uses an ultra-fast frequency-modulated continuous-wave (FMCW) radar signal. In such embodiments, the frequency can slew up and down in a variety of patterns, such as sine wave, triangle wave, or sawtooth waves. One specific example of a sawtooth wave frequency modulation will be discussed in greater detail with reference to FIGS. 2 and 3.

The saturation detector 110 can be implemented in a variety of ways. As one general example, the saturation detector 110 can be configured to measure the received radar signal and determine if the received signal is above a pre-set amplitude level, with the pre-set amplitude level selected to be indicative of saturation in the amplifier unit 108. So configured, the saturation detector 110 can be configured to provide a saturation detection signal responsive to the detection of saturation events.

The saturation detector 110 is coupled to the reset mechanism 112, with the reset mechanism 112 configured to receive the saturation detection signal. The reset mechanism 112 is coupled to the filter unit 106 and is configured to reset the filter unit 106 responsive to a received saturation detection signal that indicates saturation in the amplifier unit 108. In general, the reset mechanism 112 is configured to reset the filter unit 106 during the next inter-frame period following the detected saturation event. Resetting the filter unit 106 during the inter-frame period can clear the effects of the detected saturation event and make the radar receiver 104 ready to receive and amplify the radar signal before the next frame period of the radar signal. In one embodiment, the reset mechanism 112 is configured to reset one or more filters by generating a reset signal, with the timing of the reset signal selected such that the resulting reset of the filter occurs during the next inter-frame time period after the detected saturation event.

A variety of techniques can be used determine the timing of the reset such that the reset occurs during the inter-frame period. As one example, the reset mechanism 112 can be configured to additionally receive a frequency modulation control signal that indicates the beginning of the inter-frame period of the transmitted radar signal. Additionally, in some embodiments, the reset mechanism 112 will generate the reset signal a delay period after the beginning of the inter-frame period indicated by the frequency modulation control signal, with the amount of delay selected to assure that the reset occurs during the inter-frame period of the received radar signals. In these embodiments, the delay may be fixed or dynamically calculated. For example, the delay can be fixed based on estimated average or maximum time delay between transmitted and received radar signals. In such a case the estimated time delay between transmitted and received radar signals can be used to more accurately determine the start of the inter-frame period of the received radar signal, and thus can be used to accurately determine when the reset of the filter unit 106 should be performed.

In other embodiments, the delay may be dynamically determined at least in part on a distance to an object calculated by the radar device 100. Thus, during operation the radar device 100 calculates distances to detected objects and uses those calculated distances to dynamically determine the start of the next inter-frame period of the received radar signal and thus when the reset of the filter unit 106 should be performed.

As will be described in greater detail below, in a more specific embodiment, the saturation detector 110 includes an input common mode extraction circuit, a programmable threshold voltage generator, a positive comparator and a negative comparator. In such an embodiment, the input common mode extraction circuit is coupled to the amplifier unit 108 to receive a differential input signal, and is configured to extract both a positive common mode equivalent voltage and a negative common mode equivalent voltage. The determined positive common mode input voltage and negative common mode input voltage are coupled to a respective positive comparator, and negative comparator, with each comparator configured to compare the corresponding common mode equivalent voltage to a threshold voltage provided by the programmable threshold voltage generator.

Figure 2:
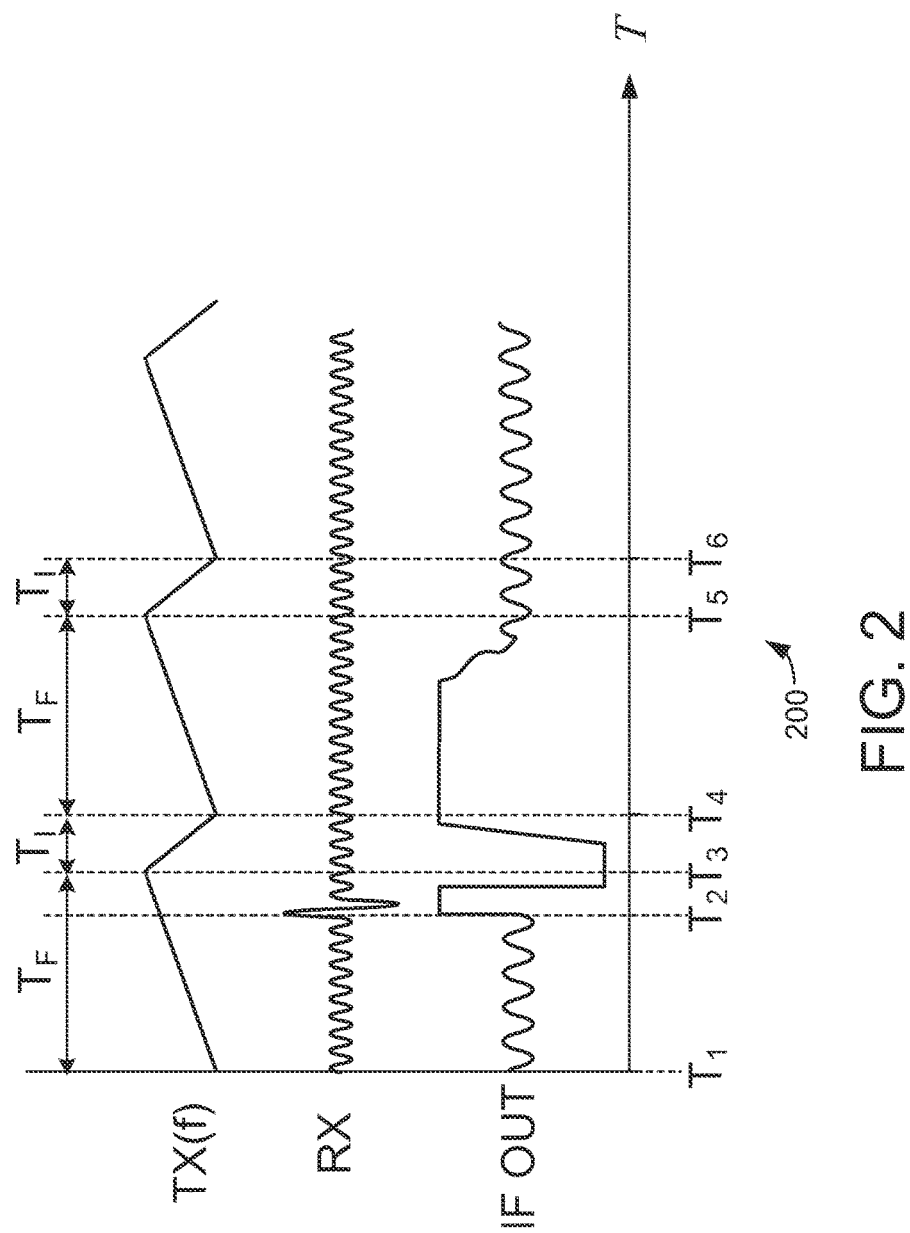
FIG. 2 is a graphical representation of various signals in a radar device.

Turning now to FIG. 2, a graph 200 illustrates exemplary signals of a radar device. Specifically, the graph 200 illustrates the frequency of an exemplary frequency-modulated continuous-wave (FMCW) radar signal (TX), an exemplary received radar signal (RX), and an exemplary amplifier output signal (IF OUT).

In graph 200, the illustrated transmitted radar signal (TX) represents the transmitted signal frequency as a function of time. In this example the transmitted radar signal (TX) is a FMCW signal having a frequency that varies over a frame period (TF). Typically, the frequency of an FMCW system increases (or decreases) during the active frame period, and the frequency returns to an initial value during inter-frame periods (TI). In the example of FIG. 2, the frequency modulation of the transmitted radar signal (TX) has a sawtooth pattern, although this is just one example of how a FMCW signal can be modulated.

Specifically, the transmitted radar signal (TX) at time T1 has a frequency at an initial value, and the frequency increases during the frame period until it reaches a final value at time T3. The frequency then quickly returns to its initial value at time T4. The time of increasing frequency between times T1 and T3 is referred to as a frame period (TF), and the time between T3 and T4 is the inter-frame period (TI).

The received radar signal (RX) is representative of a signal received and processed by the radar receiver during operation. The illustrated received radar signal (RX) can be representative of the received radar signal as received by the radar receiver, as down converted by a mixer, and as filtered by the radar receiver. Likewise, the amplifier output signal (IF OUT) is representative of an amplifier output in the radar receiver.

In some cases, anomalies and other events in the received radar signal (RX) may drive one or more amplifiers in the radar receiver into saturation. As one example, a phase shift in the transmitted radar signal can cause saturation in the amplifier. Such phase shifts can be used to code the transmitted radar signal to help the radar receiver distinguish between the transmitted radar signal and the reflected radar signal, but saturation in one or more amplifiers can be a side effect of such phase shifts. As other examples, signal spikes caused by other radar transmitters can cause both periodic and non-periodic saturations.

In FIG. 2, such an event occurs in the received radar signal (RX) at time T2. Specifically, at time T2 the received radar signal (RX) experiences a significant positive spike followed by a significant negative spike. Again, such spikes can have a variety of causes. The spikes in the received radar signal (RX) cause corresponding spikes in the amplifier output signal (IF OUT). As can be seen in FIG. 2, this results in the amplifier temporarily saturating, with the amplifier output signal (IF OUT) rising quickly to a maximum value, quickly dropping to a minimum value, before returning again to the maximum value. This saturation effect continues past the next inter-frame period (i.e., between T3 and T4) and into the next frame period (starting at time T4). As seen in FIG. 2, the amplifier remains in saturation well into the next frame period. Because the amplifier remains saturated into the next frame period, the radar data generated from that frame period (i.e., between times T4 and T5) cannot be used. Thus, the radar receiver is effectively rendered temporarily blind until after the next inter-frame period (between times T5 and T6). This temporary blindness can significantly limit the performance of the radar. It should be noted that this type of saturation profile is just one example, and that other saturation profiles can occur depending upon the magnitude of the event, the duration, and the time constant of the associated filters. Additionally, it should be noted that problem is accentuated in systems that use very fast modulation schemes, as the inter-frame periods in such systems are relatively short, and thus probability of a saturation event extending into the next frame period is relatively high.

Figure 3:
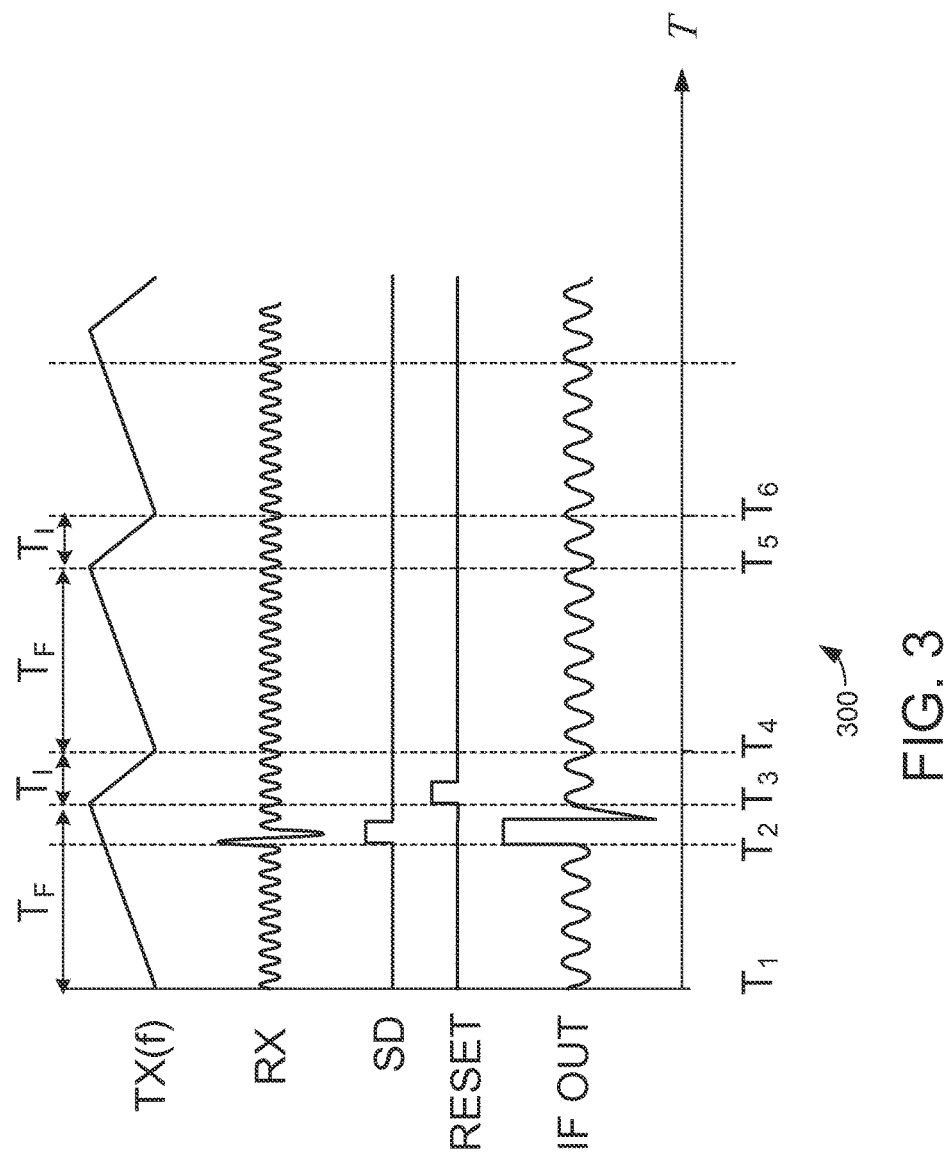
FIG. 3 is a graphical representation of various signals with filter reset in a radar device in accordance with an example embodiment.

Turning now to FIG. 3, a graph 300 illustrates exemplary signals of a radar device providing the embodiments described herein (e.g., radar device 100). Specifically, the graph 300 illustrates the frequency of an exemplary frequency-modulated continuous-wave (FMCW) radar signal (TX), an exemplary received radar signal (RX), an exemplary saturation detection signal (SD), an exemplary reset signal (RESET), and an exemplary amplifier output signal (IF OUT). In general, the saturation detection signal (SD) and the reset signal (RESET) are used to indicate a detected saturation event and reset a filter (e.g., filter unit 106) in response to a detected saturation event.

The illustrated transmitted radar signal (TX) again represents the transmitted signal frequency as a function of time. The received radar signal (RX) is again representative of a signal received and processed by the radar receiver (e.g., radar receiver 104) during operation. Likewise, the amplifier output signal (IF OUT) is again representative of an amplifier output in the radar receiver (e.g., radar receiver 104).

In FIG. 3 a saturation causing event again occurs in the received radar signal (RX) at time T2. Specifically, at time T2 the received radar signal (RX) experiences a significant positive spike followed by a significant negative spike. The spikes in the received radar signal (RX) cause a temporary saturation in the amplifier (e.g., amplifier unit 108), as seen by the rise in the amplifier output signal (IF OUT). In accordance with the embodiments described herein, this saturation is detected by at least one saturation detector (e.g., saturation detector 110). In response, the saturation detector asserts the saturation detection signal (SD). The saturation detection signal (SD) is provided to the reset mechanism (e.g., reset mechanism 112). In response, the reset mechanism asserts the reset signal (RESET) during the next inter-frame period following the detected saturation event. As was described above, a frequency modulation control signal can also be provided to the reset mechanism and used by the reset mechanism to determine the start of the next inter-frame period of the received radar signal (RX). In FIG. 3, the next inter-frame period (TI) begins at time T3, and the reset signal (RESET) is asserted thereafter. The assertion of the RESET signal clears the filter unit (e.g., filter unit 106) and makes the radar receiver ready to receive the radar signal before the next frame (TF) that starts at time T4.

This reset of the filter unit prevents the effects of the saturation event from continuing past the next inter-frame period (between T3 and T4) and into the next frame period (starting at time T4). Because the amplifier is no longer in the saturation after time T4 the radar data generated from the next frame period (between times T4 and T5) can be used. Thus, the radar receiver is not blinded beyond the frame period in which the saturation event occurred, and the performance of the radar is maintained. Again, this is particularly applicable to radar devices that use modulation schemes with relatively short inter-frame periods. This is also particularly applicable to radar devices that that use modulation schemes where the inter-frame period is not negligible if compared to the propagation delay between the transmission of a radar signal and receipt of the reflected radar signal back at the receiver.

Figure 4:
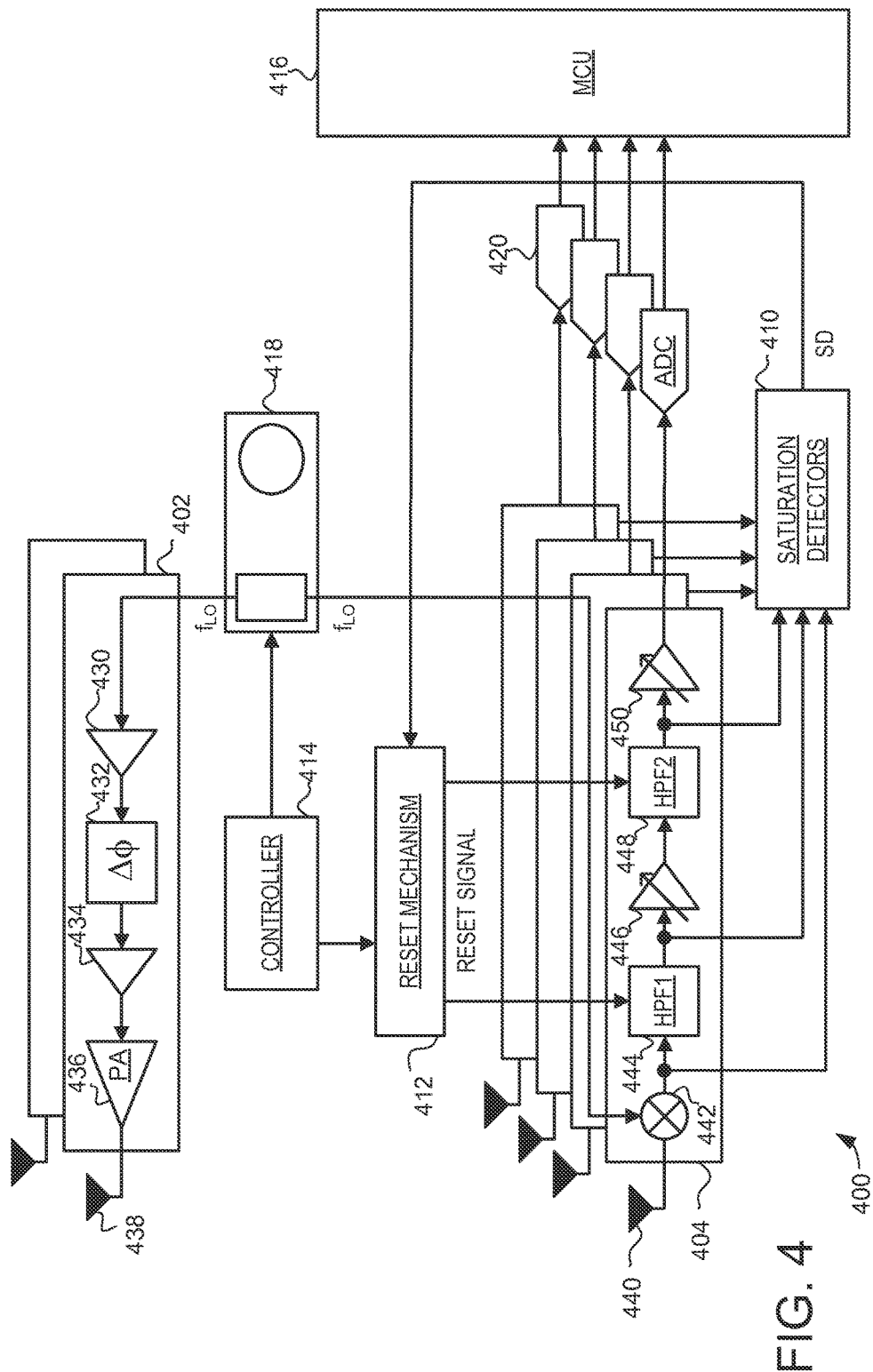
FIG. 4 is a schematic diagram of a radar device in accordance with a second example embodiment.

Turning now to FIG. 4, another embodiment of a radar device 400 is illustrated schematically. In this embodiment, the radar device 400 includes at least one radar transmitter 402, at least one radar receiver 404, a plurality of saturation detectors 410, a reset mechanism 412, a controller 414, a microcontroller unit (MCU) 416, a frequency synthesizer 418, and at least one analog-to-digital converter (ADC) 420. Each radar transmitter 402 includes an input buffer 430, a phase shift unit 432, an output buffer 434, a power amplifier 436, and an antenna 438. Each radar receiver 404 includes an antenna 440, a mixer 442, a first high pass filter 444, a first variable gain amplifier 446, a second high pass filter 448, and a second variable gain amplifier 450.

In the illustrated embodiment, the radar device 400 includes two radar transmitters 402 and four radar receivers 404. It should be noted however that this is just one example, and that other configurations are also possible. For example, in other embodiments four radar transmitters 402 and six radar receivers 404, or a single radar transmitter 402 and/or a single radar receiver 404 can be used. In any such embodiment, the one or more radar transmitters 402 are configured to transmit a radar signal, and the one or more radar receivers 404 are configured to receive a reflection of the radar signal.

The frequency synthesizer 418 generates an oscillator signal (fLO), and may comprise one or more oscillators, frequency dividers, frequency doublers, a phase comparator and/or a loop filter or any phase-locked loop (PLL) arrangement. Such oscillators can include voltage-controlled oscillators and/or digitally controlled oscillators. The oscillator signal is provided to the input buffer 430 of the transmitter 402. The oscillator signal is then fed to the phase shift unit 432 which shifts the phase of the oscillator signal over a certain number of degrees ($\Delta\phi$). For example, the phase shift unit 432 can be configured to shift the oscillator signal 180°. The phase shifted signal is fed to the output buffer 434 and from there to the power amplifier 436, which amplifies the signal to a level suitable for transmitting as a radar signal by a transmitter antenna 438.

The controller 414 is coupled to the frequency synthesizer 418 and is configured to control the frequency modulation of the transmitted radar signal generated by the frequency synthesizer 418. Thus, the controller 414 is configured to provide any suitable frequency modulation scheme, including triangle, sawtooth and frequency-shift keying. In accordance with the embodiments described herein, the controller 414 also provides the frequency modulation control signal to the reset mechanism 412. As was described above, the frequency modulation control signal can be used by the reset mechanism 412 to determine the timing of the reset such that the reset occurs during the inter-frame period.

The radar signal transmitted by the antenna 438 may by reflected by an object, such as another vehicle, pedestrian or other obstacle. Part of the reflected radar signal reaches the receiver antenna 440. The received antenna signal is fed to the mixer 442, where it is mixed with the oscillator signal (fLO) generated by the frequency synthesizer 418 to down convert the received signal to an intermediate frequency. The resulting intermediate frequency signal is fed to the first high-pass filter 444. The resulting filtered signal is fed to the first variable gain amplifier 446 which amplifies the signal before feeding it to the second high pass filter 448. This re-filtered signal is fed to a second variable gain amplifier 450, after which the signal is fed to an analog-to-digital converter 420 and is output to the MCU 416 as a digital signal. It should be noted that while two filters and two amplifiers are illustrated in the radar receiver 404, that this is just one example, and other configurations with different numbers of filters and amplifiers are possible.

The MCU 416 receives these digital signals and can be configured for a variety of signal processing tasks such as, but not limited to, target identification, determination of target distance and target velocity, and generating control signals. The MCU 416 may for example be configured for generating calibration signals, receiving data signals, receiving sensor signals, generating frequency spectrum shaping signals (such as ramp generation in the case of FMCW radar) and/or state machine signals for RF (radio frequency) circuit enablement sequences.

As on specific example, the MCU 416 can include a distance calculation unit that calculates the distance to an object based on a measured time delay between transmitted and received signals. Such a distance calculation unit can also be configured to calculate the relative velocity of the object. As will be explained in greater detail below, the distance information can be used to determine the timing of the reset signal.

In some embodiments the radar device 400 can be implemented together as a single integrated circuit, while in other embodiments the different components may be constituted by separate integrated circuits.

Each of the plurality of saturation detectors 410 is coupled to the at least one radar receiver 404. In general, each saturation detector 410 is configured to detect saturation events in a corresponding amplifier of the radar receiver 404 (e.g., variable gain amplifiers 446 and 450). In response to detected saturation events, saturation detectors 410 assert a saturation detection signal (SD), which is provided to the reset mechanism 412. The reset mechanism 412 is also coupled to the at least one radar receiver 404 and to the controller 414, and is configured to reset one or more filters (e.g., high pass filters 444 and 448) in response to the asserted saturation detection signal. Specifically, the reset mechanism 412 is configured to reset the filters 444 and 448 during the next inter-frame period of the modulated radar signal in response to the asserted saturation detection signal. This reset of the filters 444 and 448 prevents the saturation of the amplifiers 446 and 450 from continuing past the next inter-frame period and into the next frame period. Because the amplifiers 446 and 450 are no longer in the saturation into the next frame period the radar data generated from the next frame period can be used.

In this illustrated embodiment, the saturation detectors 410 are each coupled to the input of the corresponding filter (e.g., filters 444 and 448). In one embodiment, each of the saturation detectors 410 is configured to determine if the corresponding amplifier stage (mixer or/and amplifier) output is above a predetermined signal amplitude level, with that predetermined signal amplitude level set at a level that would be indicative of saturation in an amplifier stage (e.g., amplifiers 446 and 450, mixer 442). It should be noted that in this example the mixer 442 can be considered an amplifier stage, as the mixer 442 can typically include an active mixer having a certain conversion gain. A detailed example of such a saturation detector implementation will be discussed below with reference to FIGS. 6 and 7.

Figure 5:
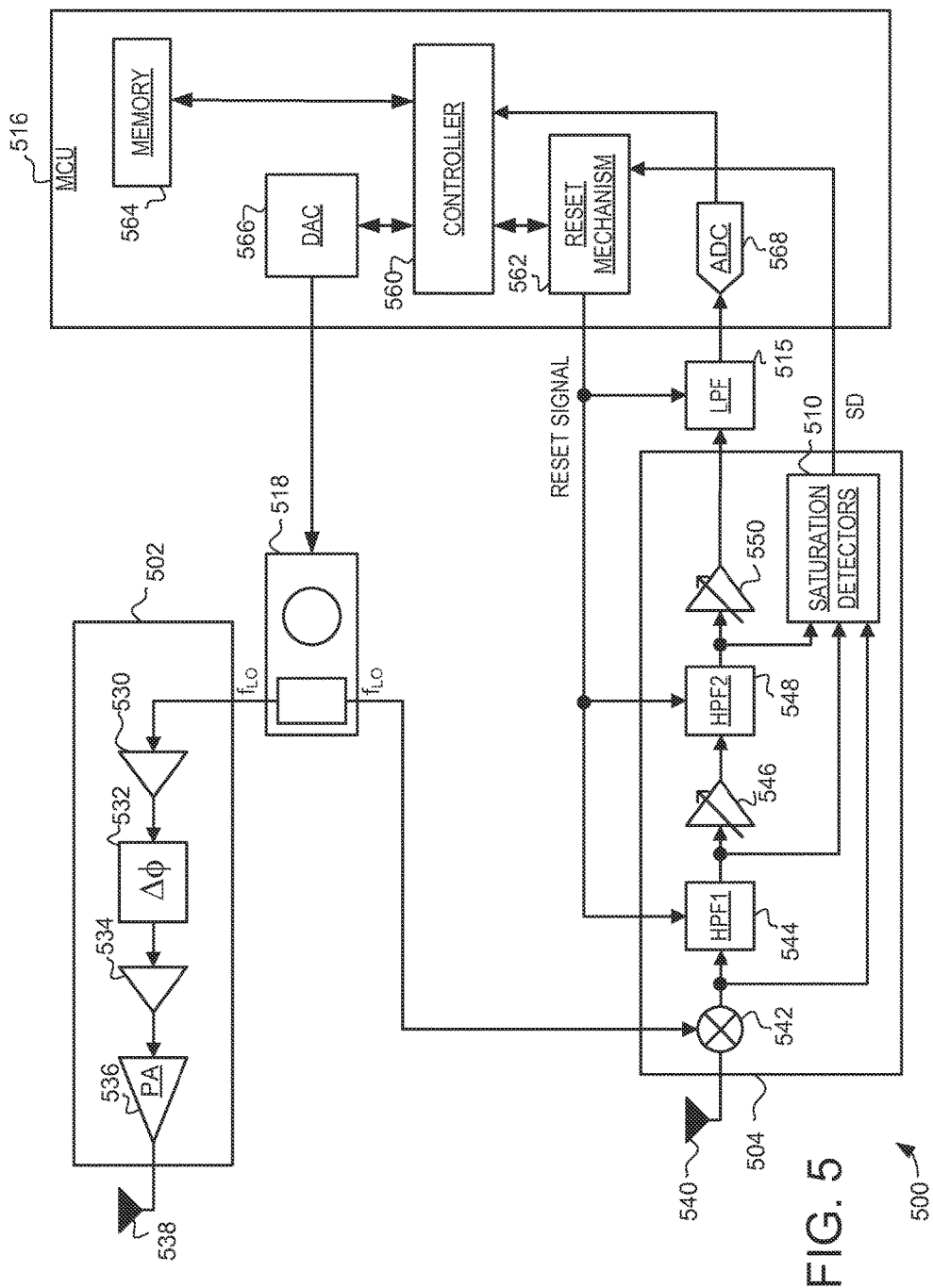
FIG. 5 is a schematic diagram of a radar device in accordance with a third example embodiment.

Turning now to FIG. 5, another embodiment of a radar device 500 is illustrated schematically. This embodiment is similar to that of radar device 400, but differs in several notable aspects. For example, the radar device 500 instead includes a single receiver and transmitter, the controller and reset mechanism are implemented as part of an MCU, and the saturation detectors are implemented as part of the radar receiver.

The radar device 500 includes a radar transmitter 502, a radar receiver 504, a low pass filter 515, a microcontroller unit (MCU) 516, and a frequency synthesizer 518. The radar transmitter 502 includes an input buffer 530, a phase shift unit 532, an output buffer 534, a power amplifier 536, and an antenna 538. The radar receiver 504 includes an antenna 540, a mixer 542, a first high pass filter 544, a first variable gain amplifier 546, a second high pass filter 548, a second variable gain amplifier 550, and saturation detectors 510. The MCU 516 includes a controller 560, a reset mechanism 562, memory 564, a digital-to-analog converter (DAC) 566, and an analog-to-digital converter (ADC) 568. In this embodiment the low pass filter 515 serves to limit the bandwidth of the signals provided to the MCU 516.

As noted above, in this embodiment the plurality of saturation detectors 510 are implemented as part of the radar receiver 504. Again, each of the plurality of saturation detectors 510 is configured to detect saturation events in a corresponding amplifier, amplifier stage, or stage of the radar receiver 504 (e.g., mixer 542, variable gain amplifiers 556 and 550). In response to detected saturation events, saturation detectors 510 assert a saturation detection signal (SD), which is provided to the MCU 516, and specifically to the reset mechanism 562. The reset mechanism is configured to generate a reset signal in response an asserted saturation detection signal (SD), and with timing determined at least in part by frequency modulation control signal from the controller 560. The reset mechanism 562 is also coupled to the radar receiver 504, and is configured to reset high pass filters 544 and 548 with the reset signal. The reset mechanism 562 is also coupled to the low pass filter 515, and is configured to reset the low pass filter 515 with the reset signal.

Specifically, the reset mechanism 562 is configured to reset the filters 544, 548 and 515 during the next inter-frame period of the modulated radar signal in response to the asserted saturation detection signal. This reset of the filters 544, 548 and 515 again prevents the saturation of the amplifiers 546 and 550 from continuing past the next inter-frame period and into the next frame period, assuring that radar data generated from the next frame period can be used. Again, a detailed example of such a saturation detector implementation will be discussed below with reference to FIGS. 6 and 7.

Figure 6:
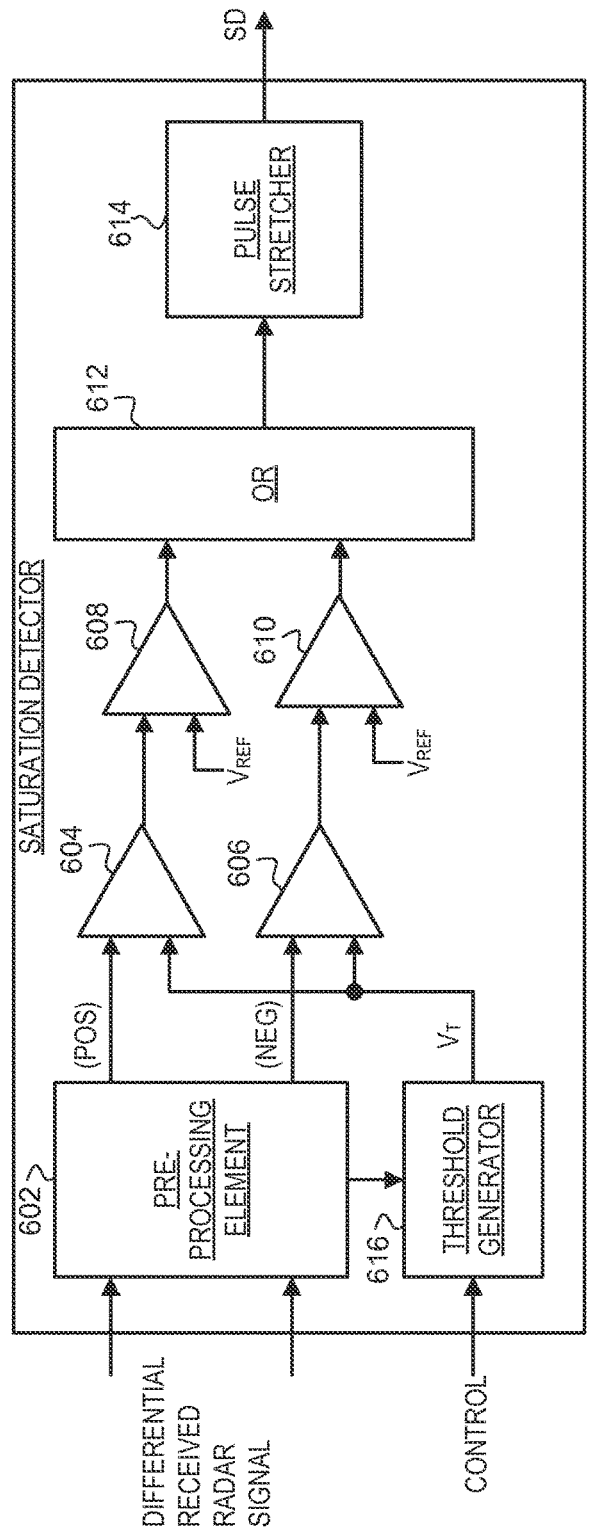
FIG. 6 is a schematic diagram of a saturation detector in accordance with an example embodiment.

Turning now to FIG. 6, an exemplary saturation detector 600 is illustrated. The saturation detector 600 is an example of an implementation that can be used for any of the various embodiments described above (e.g., as any one of saturation detectors 110, 410, 510). The illustrated saturation detector 600 includes a preprocessing element 602, comparators 604, 606, 608, 610, OR logic 612, pulse stretcher 614, and threshold generator 616. The preprocessing element 602 is configured to be coupled to the radar receiver (e.g., radar receiver 104, 404 and 505) to input the received radar signal. As was shown above in FIGS. 4 and 5, such a saturation detector 600 can be coupled to the radar receiver at any of many different locations. For example, at the inputs of various filters or amplifiers in the radar receiver.

In this illustrated embodiment, the received radar signal is in the form of a differential signal, with positive and negative signal legs being applied to the pre-processing element 602. In one embodiment, the pre-processing element 602 is configured to perform a common-mode extraction that determines positive and negative common mode equivalent voltages of the differential radar signal. In some embodiments, the pre-processing element 602 can also include an attenuator configured to attenuate the differential signal to a suitable level for such a common-mode voltage extraction.

The positive and negative common mode equivalent voltages are provided to the comparators 604 and 606 respectively. The comparators 604 and 606 compare the positive and negative common mode equivalent voltages to a threshold voltage VT provided by the threshold generator 616. In one typical embodiment, the threshold voltage VT is set at a predefined level above the normal common mode input voltage, such that the comparators 604 can detect abnormal common mode equivalent voltages above that level. When so configured the output of the comparators 608 and 610 will track any positive and/or negative differential input voltage in excess of the threshold voltage VT. It should also be noted that in some embodiments, the threshold voltage generator 616 is configured as a variable threshold voltage generator that can apply different threshold voltages VT. In such an embodiment the CONTROL input can be used to program the threshold voltage generator 616 to provide the appropriate threshold voltage VT.

In one embodiment, the comparators 604 and 606 are fast heterojunction bipolar transistors (HBT) able to operate at the relatively high radar signal frequencies. The output of the comparators 604 and 606 are coupled to the comparators 608 and 610. Comparators 608 and 610 compare the outputs to a reference voltage VREF, and in one embodiment can be implemented with relatively slow CMOS comparators. The outputs of the comparators 608 and 610 are coupled to the OR logic 612. In this configuration, the comparators 508 and 610 indicate saturation on positive and/or negative sides, and the output of the OR logic 612 provides a single output to the pulse stretcher 614. In general, the pulse stretcher 614 is used to lengthen output pulses of the comparators 608 and 610, as very narrow pulses may not be reliably captured or detected by the reset mechanism (e.g., reset mechanism 112, 412, 562). For example, the pulse stretcher 614 could be configured to stretch narrower pulses (e.g. 5 ns wide) to 70 ns wide pulses. In this embodiment, the pulse stretcher 614 will output saturation detection (SD) signal as a series of relatively wide pulses, with each pulse corresponding to a detected saturation event. In one embodiment, the pulse stretcher 614 is implemented with a monostable latch, but other implementations are also possible.

Figure 7:
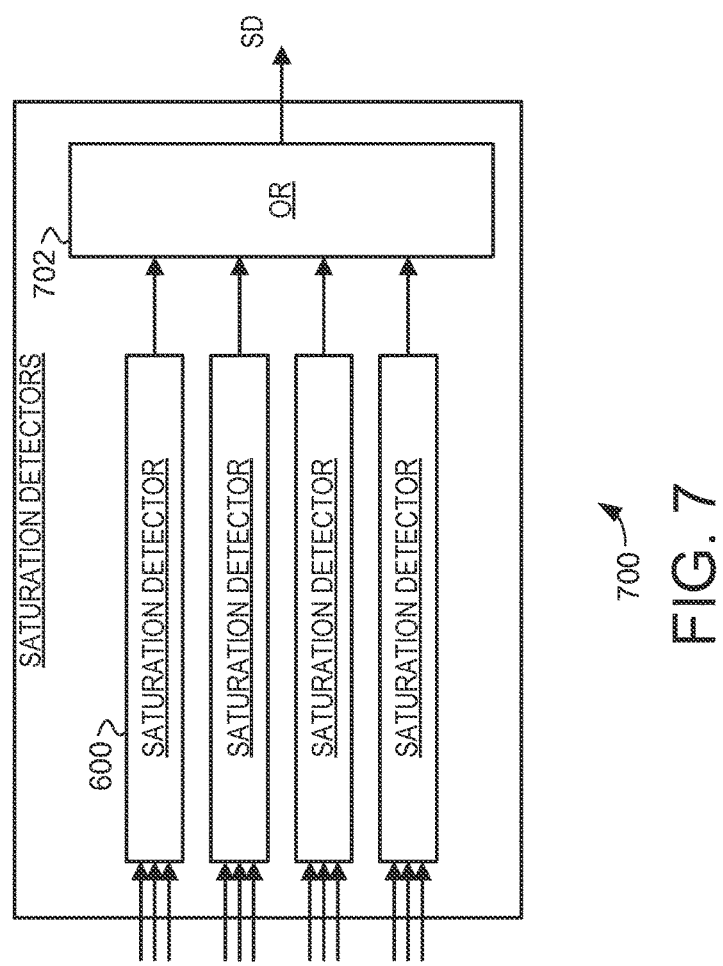
FIG. 7 is a schematic diagram of a set of saturation detectors in accordance with an example embodiment.

As shown in FIGS. 4 and 5, in a typical implementation multiple saturation detectors would be used in each radar receiver, and in many cases a radar device could include multiple radar receivers. In such embodiments, multiple saturation detectors can be combined to generate one common saturation detection (SD) signal that will be asserted in response to any of the individual saturation detectors identifying a saturation event. Turning to FIG. 7, an exemplary set of saturation detectors 700 is illustrated. In this implementation, the set of saturation detectors 700 includes four individual saturation detectors 600 with their outputs combined using OR logic 702. Each of the saturation detectors 600 includes three inputs, and an output that correspond to inputs and output illustrated in FIG. 6. The resulting saturation detection (SD) signal can then be used to indicate the occurrence of a saturation event detected in any one of the four individual saturation detectors 600. This is one example implementation, and in typical embodiments the set of saturation detectors 700 can include more or less such saturation detectors 600, with the number typically depending on the number of receivers and amplifier stages used in the radar receiver architecture. Furthermore, additional techniques can be used to combine the outputs of the saturation detectors 600 to generate the combined saturation detection (SD) signal.

As described above, the reset mechanism is configured to reset at least one filter in response to a detected saturation event indicated by such a combined saturation detection (SD) signal. In general, the reset mechanism would generate a reset signal (RESET) in response to the saturation detection signal, and with timing selected such that the resulting reset of the filter occurs during the next inter-frame time period. The frequency modulation control signal is provided to the reset mechanism, and is used to indicate the beginning of the inter-frame period of the transmitted radar signal. However, as noted above, it is desirable to perform the reset during the inter-frame period of the received radar signal. In general, the time difference between the beginning of the inter-frame period of the transmitted signal and the beginning of the inter-frame period of the received signal is equal to the propagation delay between transmitted and received signals. Thus, in some embodiments, the reset mechanism will generate the reset signal a delay period after the beginning of the inter-frame period indicated by the frequency modulation control signal, with the amount of delay selected to correspond to the propagation delay between transmitted and received signals, to thus insure that the reset occurs during the inter-frame period of the received radar signals.

In a first embodiment, the length of the delay period is set at a predetermined fixed value. For example, the delay could be fixed at an amount based on an estimated average or maximum propagation delays between transmitted and received radar signals. Such a fixed amount of delay, when added to the start time of the inter-frame period of the transmitted radar signal provided by the frequency modulation control signal, will provide an estimate of the start time of the inter-frame period of the received radar signal. In this embodiment, the estimated average or maximum propagation delay can be determined from the average or maximum range of the radar device. Thus, a radar device with longer range capability would typically use a larger delay to insure that the reset occurs in the inter-frame period of the received signal. Such a fixed delay can thus be used to accurately determine when the reset of the filter should be performed.

In a second embodiment, the length of the delay period is dynamically determined. For example, the delay could be dynamically determined based on calculated distance to a currently detected object and the propagation delay to and from the currently detected object. For example, the delay could be dynamically determined based on a calculated distance to a nearby car or pedestrian. In this case the MCU can calculate the distance to a currently detected object and provide that calculated distance to the reset mechanism. The reset mechanism can estimate an amount of propagation delay between transmitted and received radar signals based on that distance. As an example, a closer object will cause the received radar signals to have less propagation delay compared to a farther object. Such a dynamically determined delay period, when added to the start time of the inter-frame period of the transmitted radar signal provided by the frequency modulation control signal, will provide an estimate of the start time of the inter-frame period of the received radar signal. Such a dynamically determined delay period can added to the time provided by frequency modulation control signal to accurately determine when the reset of the filter should be performed.

The reset of a filter performed by the reset mechanism can be accomplished using a variety of techniques. In general, such resets would be implemented to substantially compensate for the effects of the saturation event and restore the receiver (including the various filters and amplifiers) to operating condition before the next frame period. For example, a filter can be reset by selectively connecting the filter to ground or other suitable voltage. Such an embodiment could use a switch or other mechanism to selectively connect the filter to the suitable voltage in response to the reset signal. In other embodiments, the filter could be reset by selectively shorting across one or more capacitors in the filter. For example, a filter can be reset by providing a switched resistor across the capacitor, with the switch used to selectively close the path through the resistor in response to the reset signal. Each of these examples can be applied to various types of filters in the radar receiver, including high-pass, low-pass, and band-pass filters.

Figure 8:
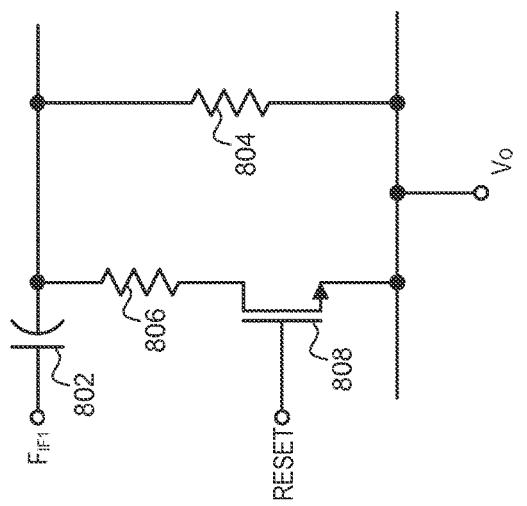
FIG. 8 is a circuit diagram of a filter with reset in accordance with an example embodiment.

Turning now to FIG. 8, a circuit diagram of a filter 800 configured for selective reset is illustrated. The filter includes a capacitor 802, resistors 804 and 806, and a transistor 808. In this illustrated example, the filter 800 is a high-pass filter. Thus, the filter 800 is example of the type of filter that can be used in the radar receivers of FIGS. 4 and 5. Specifically, the filter 800 is the type of filter that could be used for high-pass filter 444, 448, 544 and/or 548. In general, the capacitor 802 and resistor 804 provide high-pass filtering, while the resistor 806 and transistor 808 provide reset functionality. Specifically, the transistor 808 operates as a switch device and resistor 806 is a switched resistor. In one example implementation, the resistor 804 is significantly larger than the resistor 806, and the transistor 808 is a field effect transistor (FET).

During normal operation the RESET signal is low, and the transistor 808 would be off and not conducting. Thus, during normal operation no significant current flows through the resistor 806 and transistor 808, and the operation of the high-pass filter is not significantly affected. However, when the RESET signal is driven logic level high (or asserted), the transistor 808 turns on and current flows through the resistor 806 and transistor 808. Because the resistance of the resistor 806 is relatively low compared to the resistance of resistor 804, switching on the transistor 808 effectively decreases the equivalent time constant of the filter 800. Stated another way, the output node of the capacitor 802 will be pulled toward the voltage VO, where the voltage VO can be the bias voltage of the amplifier input stage. This effectively removes charge from the node of the capacitor 802, and thus clears the capacitor 802 and resets the filter 800. Stated another way, the reset clears the excess voltage from the capacitor 802 and returns the capacitor 802 to its initial voltage value.

It should be noted that the filter 800 illustrated in FIG. 8 is just one example of the type of filter that can be used in a radar device. Additionally, the resistor 806 and transistor 808 is just one example of how such a filter can be configured to be reset. Other examples of a filter can be configured for rest can be found U.S. Pat. No. 6,795,006 (Delight et al.).

In one embodiment a radar device is provided that comprises: at least one transmitter unit configured to transmit a radar signal; at least one receiver unit configured to receive a reflection of the radar signal, the receiver unit including at least one filter unit configured to filter the received radar signal and at least one amplifier unit configured to amplify the received radar signal; a saturation detector coupled to the at least one amplifier unit and configured to detect a saturation event in the at least one amplifier unit; and a reset mechanism configured to reset the at least one filter unit of the receiver unit in response to a detected saturation event.

In another embodiment a radar device is provided that comprises at least one transmitter unit, the at least one transmitter unit configured to transmit a radar signal, wherein the radar signal is a frequency-modulated continuous-wave (FMCW) signal with first frame periods and inter-frame periods; at least one receiver unit, the at least one receiver unit configured to receive a reflection of the radar signal, the at least one receiver unit including at least one filter unit configured to filter the received radar signal and at least one amplifier unit configured to amplify the received radar signal; a saturation detector coupled to the at least one filter unit and configured to detect a saturation event in the at least one amplifier unit and assert a saturation detection signal in response to the detected saturation event; and a reset mechanism configured to receive the saturation detection signal and a frequency modulation control signal, the frequency modulation control signal indicating a start of a next inter-frame period, the reset mechanism configured to reset the at least one filter unit a delay period after the indicated start of the next inter-frame period in response to the saturation detection signal being asserted in a current frame period.

In another embodiment a method is provided that comprises the steps of: receiving a reflection of a radar signal at a receiver unit, the receiver unit including at least one filter unit configured to filter the received radar signal and at least one amplifier unit configured to amplify the received radar signal; detecting a saturation event in the at least one amplifier unit; and resetting the at least one filter unit of the receiver unit in response to a detected saturation event.

The embodiments described above can be implemented in a variety of ways. For example, the techniques described above can be implemented on an exemplary non-transitory tangible computer readable storage medium. For example, the computer readable medium can be a hard disk, solid state memory, flash memory, etc., and may be non-recordable or recordable Such a storage medium can store instructions which allow a processor to carry out the method of operating a radar device as defined herein.

More in particular, the instructions allow a processor to carry out a method of operating a radar device comprising at least one transmitter unit for transmitting a radar signal, at least one receiver unit for receiving a reflected radar signal, the receiver unit comprising at least one filter unit for filtering the received signal, and at least one amplifier unit, the method comprising detecting a saturation event in the at least one amplifier unit and providing a reset of the at least one filter unit in response to the detected saturation event.

The invention may therefore also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

In the foregoing specification, the invention has been described with reference to specific examples of embodiments of the invention. It will, however, be evident that various modifications and changes may be made therein without departing from the scope of the invention as set forth in the appended claims. For example, the connections may be any type of connection suitable to transfer signals from or to the respective nodes, units or devices, for example via intermediate devices.

Accordingly, unless implied or stated otherwise the connections may for example be direct connections or indirect connections. However, other modifications, variations and alternatives are also possible. The specifications and drawings are, accordingly, to be regarded in an illustrative rather than in a restrictive sense.

Although the examples have been described with reference to FMCW radar, other types of radar may also be used. Furthermore, although the examples are described in the context of vehicle radar systems, these may also be applied to other types of radar. Device functionally forming separate devices may be integrated in a single physical device. Also, the units and circuits may be suitably combined in one or more semiconductor devices. That is, the radar device may be implemented as a single integrated circuit, or as multiple integrated circuits.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an."

The terms "first," "second," "third," "fourth" and the like in the description and the claims are used for distinguishing between elements and not necessarily for describing a particular structural, sequential or chronological order. It is to be understood that the terms so used are interchangeable under appropriate circumstances. Furthermore, the terms "comprise," "include," "have" and any variations thereof, are intended to cover non-exclusive inclusions, such that a circuit, process, method, article, or apparatus that comprises a list of elements is not necessarily limited to those elements, but may include other elements not expressly listed or inherent to such circuit, process, method, article, or apparatus. The term "coupled," as used herein, is defined as directly or indirectly connected in an electrical or non-electrical manner.

While the principles of the inventive subject matter have been described above in connection with specific systems, apparatus, and methods, it is to be clearly understood that this description is made only by way of example and not as a limitation on the scope of the inventive subject matter. The various functions or processing blocks discussed herein and illustrated in the Figures may be implemented in hardware, firmware, software or any combination thereof. Further, the phraseology or terminology employed herein is for the purpose of description and not of limitation.

The foregoing description of specific embodiments reveals the general nature of the inventive subject matter sufficiently that others can, by applying current knowledge, readily modify and/or adapt it for various applications without departing from the general concept. Therefore, such adaptations and modifications are within the meaning and range of equivalents of the disclosed embodiments. The inventive subject matter embraces all such alternatives, modifications, equivalents, and variations as fall within the spirit and broad scope of the appended claims.

What is claimed is:

1. A radar device comprising:
   at least one transmitter unit configured to transmit a radar signal;
   at least one receiver unit configured to receive a reflection of the radar signal, wherein the receiver unit comprises at least one filter unit configured to filter the received radar signal and at least one amplifier unit configured to amplify the received radar signal;
   a saturation detector coupled to the at least one amplifier unit and configured to detect a saturation event in the at least one amplifier unit; and
   a reset mechanism configured to reset the at least one filter unit of the receiver unit in response to a detected saturation event.

2. The radar device of claim 1 wherein the at least one transmitter unit is configured to modulate the radar signal with frame periods and inter-frame periods, and wherein the reset mechanism is configured to reset the at least one filter unit of the receiver unit in response to the detected saturation event by resetting the at least one filter unit during a next inter-frame period.

3. The radar device of claim 2 wherein the at least one transmitter unit is configured to increase frequency of the radar signal between an initial frequency value and a higher frequency value during frame periods and decrease the frequency of the radar signal to the initial frequency value during inter-frame periods.

4. The radar device of claim 2 wherein the at least one transmitter unit is configured to decrease frequency of the radar signal between an initial frequency value and a lower frequency value during frame periods and increase the frequency of the radar signal to the initial frequency value during inter-frame periods.

5. The radar device of claim 1 wherein the saturation detector is configured to extract a common mode voltage from the received radar signal and to compare the extracted common mode voltage to a threshold voltage to detect the saturation event in the at least one amplifier unit.

6. The radar device of claim 1 wherein the received radar signal is a differential radar signal, and wherein the saturation detector is configured to extract a positive common mode equivalent voltage and a negative common mode equivalent voltage from the differential radar signal, and wherein saturation detector is further configured to compare the positive common mode equivalent voltage to a variable threshold voltage and to compare the negative common mode equivalent voltage to the variable threshold voltage to detect a saturation event.

7. The radar device of claim 1 wherein the at least one filter unit comprises a capacitor, and wherein the reset mechanism is configured to reset the at least one filter unit by removing excess charge from the capacitor.

8. The radar device of claim 1 wherein at least one filter unit comprises a capacitor, a resistor, and a switch device in series with a switched resistor, wherein the switched resistor has a resistance less than the resistor, and wherein the reset mechanism is coupled to the switch device and is configured to reset the at least one filter unit by switching on the switch device to decrease an equivalent time constant of the at least one filter unit.

9. The radar device of claim 1 wherein the reset mechanism is further configured to receive a frequency modulation control signal, the frequency modulation control signal indicating a start of an inter-frame period in the transmitted radar signal.

10. The radar device of claim 9 wherein the reset mechanism is configured reset the at least one filter unit of the receiver unit subsequent to a delay period after the indicated start of the inter-frame period in the transmitted radar signal.

11. The radar device of claim 10 wherein the delay period is a predetermined fixed period based on a propagation delay at a maximum range of the radar device.

12. The radar device of claim 10 wherein the radar device is further configured to determine a distance to a detected object, and wherein the delay period is a dynamically determined period based on the determined distance to an object and a propagation delay at the determined distance.

13. A radar device comprising:
at least one transmitter unit, the at least one transmitter unit configured to transmit a radar signal, wherein the radar signal is a frequency-modulated continuous-wave (FMCW) signal modulated with frame periods and inter-frame periods;
at least one receiver unit, the at least one receiver unit configured to receive a reflection of the radar signal, the at least one receiver unit including at least one filter unit configured to filter the received radar signal and at least one amplifier unit configured to amplify the received radar signal;
a saturation detector coupled to the at least one filter unit and configured to detect a saturation event in the at least one amplifier unit and assert a saturation detection signal in response to the detected saturation event; and
a reset mechanism configured to receive the saturation detection signal and a frequency modulation control signal, the frequency modulation control signal indicating a start of a next inter-frame period, the reset mechanism configured to reset the at least one filter unit a delay period after the indicated start of the next inter-frame period in response to the saturation detection signal being asserted in a current frame period.

14. A method of operating a radar device comprising:
receiving a reflection of a radar signal at a receiver unit, the receiver unit including at least one filter unit configured to filter the received radar signal and at least one amplifier unit configured to amplify the received radar signal;
detecting a saturation event in the at least one amplifier unit; and
resetting the at least one filter unit of the receiver unit in response to a detected saturation event.

15. The method of claim 14 further comprising transmitting the radar signal, and wherein the transmitting the radar signal comprises modulating the radar signal with frame periods and inter-frame periods, and wherein the step of resetting the at least one filter unit of the receiver unit in response to the detected saturation comprises resetting the at least one filter unit during a next inter-frame period.

16. The method of claim 14 wherein the step of detecting the saturation event in the at least one amplifier unit comprises extracting a common mode voltage from the received radar signal and comparing the extracted common mode voltage to a threshold voltage.

17. The method of claim 14 wherein the at least one filter unit comprises a capacitor, and wherein the step of resetting the at least one filter unit comprises removing excess charge from the capacitor.

18. The method of claim 14 wherein the step of resetting the at least one filter unit of the receiver unit in response to the detected saturation event comprises resetting a delay period after an indicated start of a next inter-frame period in the transmitted radar signal.

19. The method of claim 18 wherein the delay period is a predetermined fixed period based on a propagation delay at maximum range of the radar device.

20. The method of claim 18 wherein the delay period is a dynamically determined period based on a determined distance to an object and a propagation delay at the determined distance.

* * * * *